United States Patent
Chang et al.

(10) Patent No.: US 11,562,362 B1
(45) Date of Patent: Jan. 24, 2023

(54) SYSTEMS AND METHODS FOR A VIRTUAL IDENTITY CARD

(71) Applicant: Wells Fargo Bank, N.A., San Francisco, CA (US)

(72) Inventors: Michael H. Chang, Millbrae, CA (US); Cynthia James, San Francisco, CA (US); Joon Maeng, Newcastle, WA (US); Darius A. Miranda, San Francisco, CA (US); Muhammad Farukh Munir, Pittsburg, CA (US); Darrell L. Suen, San Ramon, CA (US); Charlotte Yan Whitney, Berkeley, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 281 days.

(21) Appl. No.: 15/878,223

(22) Filed: Jan. 23, 2018

(51) Int. Cl.
*G06Q 20/40* (2012.01)
*G06Q 20/10* (2012.01)
*H04L 9/40* (2022.01)

(52) U.S. Cl.
CPC ....... *G06Q 20/40145* (2013.01); *G06Q 20/10* (2013.01); *H04L 63/0861* (2013.01)

(58) Field of Classification Search
CPC .................. H04L 63/08; H04L 9/3231; G06Q 20/0425; G06F 21/31
See application file for complete search history.

(56) References Cited

U.S. PATENT DOCUMENTS

| | | | |
|---|---|---|---|
| 7,725,732 B1 * | 5/2010 | Ballard ................. | H04L 9/3231 713/186 |
| 7,864,987 B2 * | 1/2011 | Venkatanna ............ | G06F 21/32 704/250 |
| 8,150,108 B2 * | 4/2012 | Miller .................... | G06V 40/70 382/116 |
| 8,175,889 B1 * | 5/2012 | Girulat, Jr. ............. | G06Q 30/01 705/1.1 |
| 8,412,631 B2 | 4/2013 | Crofts et al. | |
| 8,433,921 B2 * | 4/2013 | Ballard ................. | H04L 9/3231 713/186 |
| 8,595,058 B2 | 11/2013 | Fordyce et al. | |
| 8,621,209 B1 * | 12/2013 | Johansson ............... | H04L 63/08 713/155 |
| 9,020,966 B2 * | 4/2015 | Erol ...................... | G06F 16/583 707/718 |
| 9,104,537 B1 * | 8/2015 | Penilla ............... | G06Q 30/0643 |
| 9,202,032 B2 * | 12/2015 | White ................... | H04L 9/3228 |
| 9,215,274 B2 * | 12/2015 | Penilla ................. | B60L 53/665 |
| 9,305,298 B2 | 4/2016 | Wilson | |
| 9,342,831 B1 | 5/2016 | Davis et al. | |
| 9,485,237 B1 * | 11/2016 | Johansson ............. | H04L 9/3231 |
| 9,819,684 B2 * | 11/2017 | Cernoch ................. | H04L 63/08 |
| 9,870,388 B2 * | 1/2018 | Erol ..................... | G06V 30/414 |
| 9,967,250 B2 * | 5/2018 | Johansson ............. | H04L 9/3231 |

(Continued)

*Primary Examiner* — Daniel S Felten
(74) *Attorney, Agent, or Firm* — Foley & Lardner LLP

(57) ABSTRACT

According to one example arrangement, a computer implemented method performed by a computing system, includes identifying a user device associated with a user. Authentication information regarding the user indicative of use of the user device is captured. A confidence level for the user is dynamically adjusted based on the authentication information. The confidence level is responsive to the use of the user device by the user.

8 Claims, 3 Drawing Sheets

(56) References Cited

U.S. PATENT DOCUMENTS

| | | | |
|---|---|---|---|
| 9,967,262 B1* | 5/2018 | Santos | H04L 67/306 |
| 9,979,707 B2* | 5/2018 | Miller | H04L 63/083 |
| 10,007,928 B2* | 6/2018 | Graham | G06F 16/583 |
| 10,063,564 B2* | 8/2018 | Seigel | H04L 63/0876 |
| 10,075,846 B1* | 9/2018 | Acar | H04L 63/0861 |
| 10,282,537 B2* | 5/2019 | Swart | G06F 21/316 |
| 10,375,119 B2* | 8/2019 | Aronowitz | H04L 63/08 |
| 10,395,129 B2* | 8/2019 | Bauchspies | G06K 9/00926 |
| 10,460,090 B2* | 10/2019 | Kobres | G06F 21/316 |
| 10,541,993 B2* | 1/2020 | Johansson | H04L 63/083 |
| 10,554,759 B2* | 2/2020 | Penilla | B60W 50/0098 |
| 10,977,508 B2* | 4/2021 | Wu | G06K 9/00248 |
| 11,138,300 B2* | 10/2021 | Kshirsagar | H04L 63/0861 |
| 2003/0190592 A1* | 10/2003 | Bruno | G09B 7/06 434/322 |
| 2005/0216768 A1* | 9/2005 | Eppert | G06Q 20/4014 726/5 |
| 2009/0276839 A1* | 11/2009 | Peneder | G06F 21/40 726/8 |
| 2010/0223184 A1 | 9/2010 | Perlman | |
| 2012/0072975 A1* | 3/2012 | Labrador | G06F 21/31 726/6 |
| 2013/0204785 A1 | 8/2013 | Monk et al. | |
| 2014/0289833 A1 | 9/2014 | Briceno et al. | |
| 2016/0358172 A1 | 12/2016 | Ziat et al. | |
| 2016/0379186 A1* | 12/2016 | Smith | G06Q 20/0425 705/45 |
| 2017/0372049 A1* | 12/2017 | Tieu | G06F 21/36 |

* cited by examiner

SYSTEMS AND METHODS FOR A VIRTUAL IDENTITY CARD

TECHNICAL FIELD

Arrangements of the present disclosure relate to systems and methods for facilitating payment transactions.

BACKGROUND

Individuals often have one or more accounts that enable them to, among other functions, provide payment to other individuals or entities. For example, an individual may have an account at a provider institution that allows them to pay bills, transfer funds, and the like. These various payments can use any number of payment channels or rails to effectuate the payment. These payment channels or rails (henceforth collectively referred to as "payment channels") may include, but are not limited to, any of the Automated Clearing House ("ACH"), a wire transfer rail, real-time payment system rail, a credit card processing rail, and the like. For ease of use, many individuals conduct transactions through the account at the provider institution on a mobile computing device.

As transactions, interactions, and communications occur over various internet-centric services via personally-owned mobile devices, the actual identities of the parties involved may be unknown. While the internet adds convenience, the identity of the transacting parties is, at times, unknown or unverified. Even authentication systems with username and password login restrictions are susceptible to use by an entity that is not the intended authenticating person, especially if in possession of a mobile computing device with lax security settings and/or automatic log in credentials. Accordingly, transactions through a provider institution account linked with a mobile device may not be initiated by the customer associated with the provider institution account (e.g., fraudulent transactions).

SUMMARY

According to one example arrangement, a computer implemented method performed by a computing system, includes identifying a user device associated with a user. Authentication information regarding the user indicative of use of the user device is captured. A confidence level for the user is dynamically adjusted based on the authentication information. The confidence level is responsive to the use of the user device by the user.

Another arrangement relates to a system for managing a virtual identity card circuit by a computing system of a provider institution. The system includes an accounts database structured to store information regarding a user, wherein the information is indicative of at least one of a biometric characteristic of the user and a behavioral characteristic of the user. The system further includes a virtual identity card circuit communicably and operatively coupled to the accounts database. The a virtual identity card circuit structured to identify a user device associated with a user. Authentication information regarding the user indicative of use of the user device is captured. A confidence level for the user is dynamically adjusted based on the authentication information. The confidence level is responsive to the use of the user device by the user.

According to another example arrangement, a computer implemented method performed by a provider computing system, includes receiving an initial enrollment of a user. The initial enrollment includes a biometric enrollment data and a user identifier associated with the user. The biometric enrollment data includes at least one biometric enrollment sample. The at least one biometric enrollment sample is processed using a biometric processing algorithm to generate a biometric reference template. The biometric reference template can be used to match a biometric authentication sample from the user. A user device associated with a user is identified. A confidence level for the user is generated. The confidence level responsive to the use of the user device by the user. The confidence level for the user is dynamically adjusted based on the authentication information.

These and other features, together with the organization and manner of operation thereof, will become apparent from the following detailed description when taken in conjunction with the accompanying drawings.

DETAILED DESCRIPTION

Figure 1:
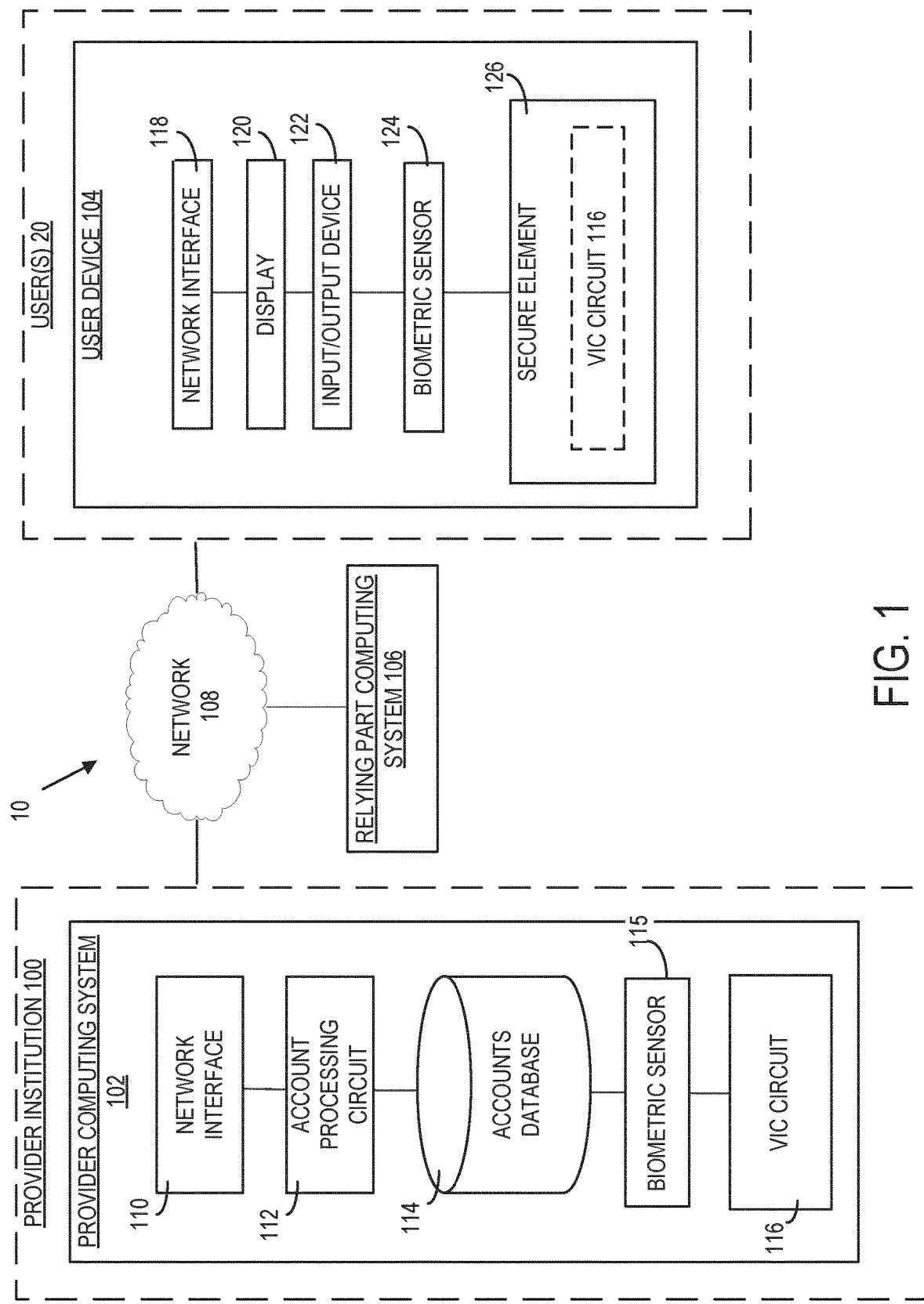
FIG. 1 is a schematic diagram of a virtual identity card system, according to an example arrangement.

Transactions over current payment channel ecosystems are increasingly being initiated and conducted on a customer's mobile computing device (e.g., smartphones, tablet computing systems, laptop computing systems, desktop computing systems, PDAs, smart watches, smart glasses, tablets, etc.). Typically, customers install a provider institution's mobile application to one or more mobile computing devices associated with, and primarily used by, the customer. The provider institution mobile application allows the customer to user his or her mobile computing device to access a account with the provider institution. The access typically includes entering a username and passcode combination. Once accessed, the customer can view, conduct transactions, or other activity on the customer's mobile computing device. In many instances, the customer may have his or her mobile computing device auto populate login information to access the provider institution account through the mobile application. In other instances, the customer may have settings that keep the customer logged into (e.g., no password or username entry) the account for a period of time (e.g., a day, week, month). Under the current mobile application-customer mobile computing device transaction ecosystem, a provider institution is unable to determine if the user of the customer mobile computing device is the authorized customer of the account. In other words, when a transaction for a customer account is conducted through the customer device, a provider institution is unable to determine if the customer still has access to the customer device.

A virtual identity card ("VIC"), which provides a unique identifier-manifested in a wide variety of ways—to allow for an individual to continuously authenticate and conduct transactions with others, is described and provided herein. The VIC represents a customer's personal identity information (e.g., associated with transactions, history of non-monetary services, reputation scores, assets, places that the customer had gone, and the like) through a customer device linked to the customer account of the provider institution. The VIC is configured to examine the totality of the relationship between a provider institution and a customer (e.g., account holder, individual, customer, etc.) and the relationship between the customer and the customer device and, based off of a plurality of inputs and factors, authorize or deny a requested transaction by a customer/customer device.

Expanding generally, the VIC is a form of identification for P2P (peer-to-peer), P2B (peer-to-business) and other types of transactions. A user (e.g., customer) first enrolls a VIC by providing necessary authentication information (e.g., birth certificates, financial statements, state-issued licenses, biometrics, and the like) to have the VIC issued by a VIC processing system (e.g., a provider computing system). Responsive to an initiated transaction (e.g., via a user device), the VIC processing system can issue the VIC in any suitable manifestation to verify the user, either to the user device, a relying party (e.g., merchant), or provider institution branch. The VIC may be in the form of a confidence level that the user initiating the transaction on the user device is the authorized user (e.g., account holder). In order to dynamically determine the confidence level, the user may be required to periodically perform continued enrollment to strengthen the VIC. Such continuous enrollment can be background process that is taking place without the user's knowledge (e.g., passive enrollment), thus saving time and improving reliability. Additionally, such continuous enrollment can be prompted by the VIC processing system (e.g., active enrollment).

By way of example of the continuous enrollment, the VIC processing system may cause the user device to periodically capture the user's voice (e.g., capturing voice profile, but not content, when the user is using the user device for a call) and correlate with previously captured voice to make sure that the person using the user device is still the user associated with the VIC. Similarly, digital photographs taken by the user (e.g., selfies) using the user device can also function as continued enrollment. Such continued enrollment are examples of passive continued enrollment. Additionally, the VIC processing system may initiate a prompt on the user device and have the user speak passphrase into the phone. Doing so allows the VIC processing system to correlate the prompted capture voice profile with a previously captured voice to make sure that the person using the user device is still the user associated with the VIC. Such continued enrollment may be performed independent of any transactions that require VIC verification processes. Such continuous enrollment can also account for changes to the biometric information (e.g., how the user looks or how the user's voice changes over time) over time.

Biometrics may be used by the VIC processing system to provide a "something-you-are" factor used for identification and authentication. Biometric traits may include, for example, biological (e.g., fingerprint, iris, hand geometry, etc.) and behavioral (e.g., gait, gesture, keystroke dynamics, etc.) characteristics that reliably distinguish one person from another. Through a biometric service (e.g., provides biometric data and a non-biometric means of confirming an identity), the individual can be authenticated. Biometric authentication (e.g., identification and verification) leverages the universally recognized fact that certain physiological or behavioral characteristics can reliably distinguish one person from another. Biometric technology includes both automatically collecting and comparing these characteristics. Digital representations of these characteristics are stored in an electronic medium and later used to authenticate the identity of an individual.

As used herein, the phrase "confidence level" refers to the likelihood that the initiating party of the transaction through the user device is the authorized user, and account holder, of the provider institution's account. In this regard, the identity "confidence level" of a user may be indicative of the level of identifying information provided during enrollment into the VIC processing system and the continued enrollment and authentication of the user device over a period of time. The "confidence level" of a user may also affect transaction specific details, for example, related to the allowed quantity (i.e., amount) or quality (i.e., recipient) of the requested transaction. For example, if the user has a low confidence score a large transaction to a new recipient may be rejected by the provider institution or require active continued enrollment on the user device by the initiating party to verify that he or she is the authorized user and account holder. Therefore, a transaction request submitted by the user with a low confidence level that designates a "riskier" recipient or amount may be rejected by the VIC processing system. The confidence level may be indicative of, or incorporate user financial history, including funds available to the user and the transaction history (e.g., common transactions, previous recipients, payment channels used, etc.). The confidence level may be a sliding scale from 1 to 100 with various numbers benchmarking access to effectuate different levels (e.g., amount, recipient, etc.) of transactions. In other arrangements, the confidence level is a binary system.

As mentioned above, the VIC circuit may be structured to determine a confidence level for a user of a provider institution indicative of an "initial enrollment" of the user. The initial enrollment refers to the level, categorization, or other classification of the user based on at least one of financial information regarding the user, biometrics captured from the user, and a customer device. The financial information regarding the user may include, but is not limited to, a transaction history, an identity of a funds transfer recipient(s), one or more account balance(s), a fraud risk, an account history (e.g., predicted withdrawals/deposits over a certain amount of time, etc.), etc. The biometric may include, but is not limited to, one or more biometric data samples (e.g., fingerprint, voiceprint, iris image, hand geometry, keystroke patterns, dynamic signatures) (typically two or more samples) captured from the user via a biometric sensor. A biometric service provider ("BSP") may be tasked with verifying and vetting the user's identity during initial enrollment and/or during continued enrollment. In some instances, this includes vetting the user identity against collateral material such as photo identification, government-issued identification, birth certificates, and the like. The customer device may include, but is not limited to, type of device, ability to capture biometrics, security settings, and related mobile device characteristics. As will be appreciated, biometrics captured using a vetted or trusted process are referred to herein as "enrollment" [biometric type] (e.g., fingerprint, voiceprint, iris image, hand geometry, keystroke patterns, dynamic signatures). The initial enrollment may be an initial starting point or input for the confidence level. The more robust (e.g., multiple biometrics captured) the higher the confidence level of the VIC. In some arrangements, enrolling certain biometric types (e.g., those that have robust capturing and matching algorithms) may result in a higher confidence level compared to another biometric type. For example, the user enrolling an iris scan may increase the confidence level greater than the user enrolling a fingerprint.

For purposes of the arrangements described herein, the term "payment channels" refers to the channel, rail, or pathway associated with the movement of funds from a payor to a payee. In this regard, the term "payment channel" refers to the "how" of transferring funds in a transaction. In contrast, a "payment device" (e.g., credit card, check, debit card, etc.) describes the "what" that is used to initiate the funds transfer. Accordingly, examples of payment channels include, but are not limited to, an electronic wire fund transfer channel, an ACH fund transfer channel, a bill pay fund transfer channel, a check processing transfer channel, a real-time payment rail, etc.

In one arrangement, the systems and methods described herein may be implemented by a provider computing system associated with a provider institution. The provider computing system may have a VIC circuit configured to monitor and dynamically adjust the confidence level for the user and, ultimately, approve or deny a requested transaction. In other arrangements, the VIC processing system is a separate computing system or entity relative to the provider institution, whereby the VIC processing system enrolls, monitors (e.g., continuous enrollment), and dynamically adjusts the confidence level for the user and upon receipt of a transaction request from the provider institution, transmits a transaction approval or denial value to selectively authorize or deny the requested fund transfer based on at least the confidence level. In this arrangement, a VIC circuit may be located, either in part or as a whole, on a user device (e.g., smartphone) configured to perform all or most of the processes described herein with respect to the VIC processing system. In either arrangement, the VIC processing calculates, establishes, or otherwise determines a confidence level for the user device.

Based on the foregoing, the VIC processing system (or VIC circuit in a provider institution) is structured to generate, maintain, and update the VIC for a user. In some arrangements, the VIC circuit is structured to control whether a requested transaction is approved or denied. It should be understood that the term "dynamically determined confidence level" applies to dynamic calculation of the limit for at least one of the authentication information of the user enrollment information, continuous enrollment, and a transaction request. In some arrangements, the VIC circuit is loaded, provided, disposed, or otherwise stored on a secure element of the user's mobile device to provide a relatively more secure location for monitoring and updating the confidence level and approving or denying requested funds transfers. In some arrangements, the VIC circuit may generate a request to prompt the user to modify a requested transaction (i.e., the requested transaction is neither approved nor denied). As will be appreciated, the VIC circuit acts as an authorization engine for all payment instruments, services, and the like, for a user. In some arrangements, a VIC token or authentication verification may be pushed to the user device for a transaction originating from a third-party. For example, a merchant is charging the provider institution account of the user, the VIC processing system may transmit the VIC token to the user device to be presented to the merchant and confirm the identity of the user.

The VIC processing system allows the provider institution to improve the user's experience by dynamically tailoring, adjusting, and controlling an identity-based confidence level of an individual user through a user device. Consequently, the VIC circuit may alleviate the problem of having a potential transaction fraudulently initiated. In operation, the VIC processing system of the present disclosure provides technical solutions to computer-centric and payment channel-centric problems associated with conventional funds transfer systems and authentication of one or more users. For example, the VIC processing system, according to various arrangements, provides a more effective and efficient mechanism to the industry by providing a changing control mechanism for approving and denying funds transfer requests based on the usage of a user device. These computer-centric problems exist because the current payment channel ecosystem is increasingly conducted on user mobile computing devices and could not occur without the use of computers and communication between the computers over a network. The VIC processing system provides for arrangements that overcome the shortcoming and issues with the current payment channel and user-device authentication issues of processing funds transfers. Further, the methods and systems described herein alleviate the strain on processing power and memory components currently required to manage, approve, and facilitate funds transfer requests. By calculating a confidence level, users may be batch processed into a limited number of categories (i.e., tiers) thereby facilitating relatively quick dynamic control until more detailed individualistic assessments are conducted and made by the VIC circuit.

Figure 2:
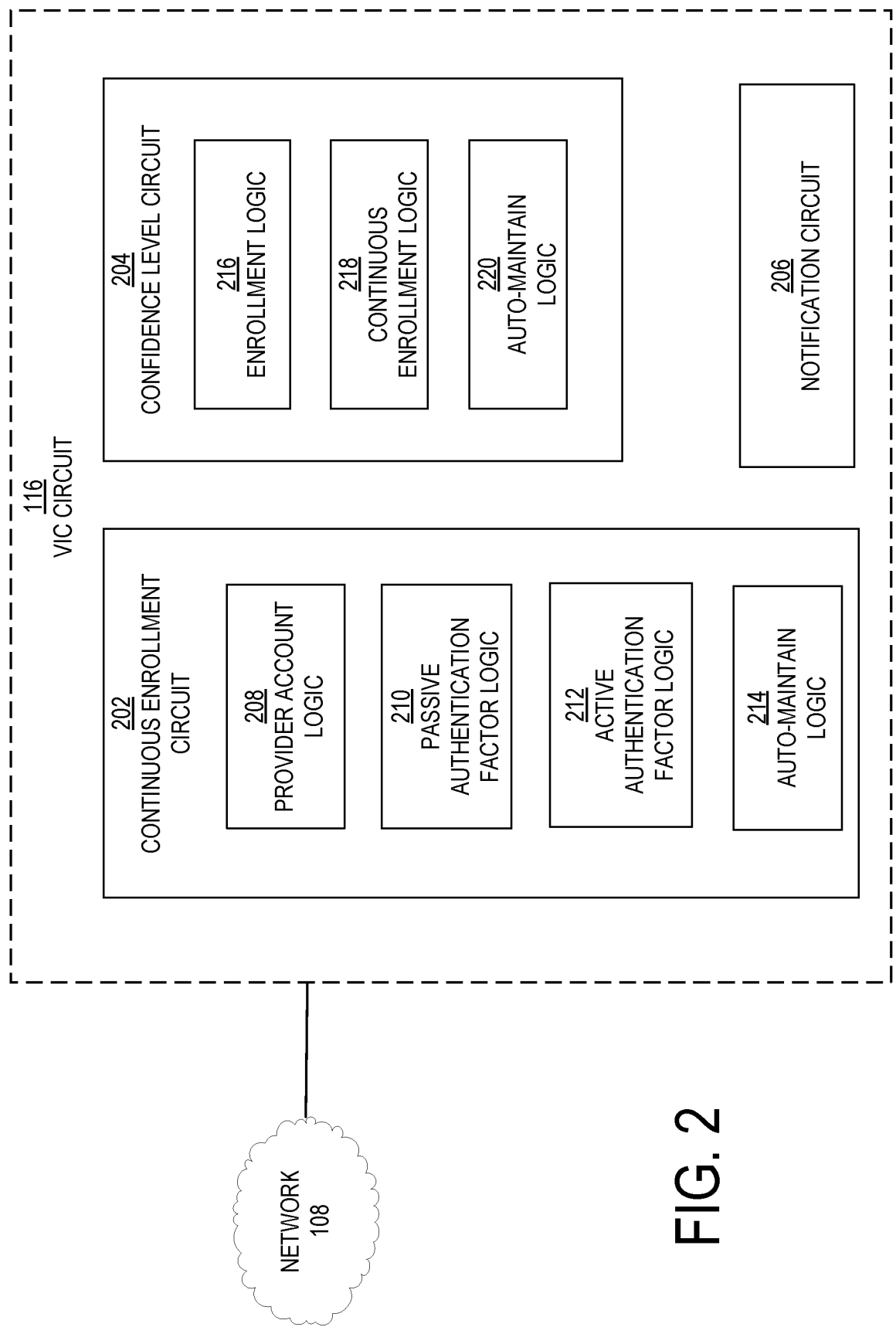
FIG. 2 is a schematic diagram of the virtual identity card circuit of FIG. 1, according to an example arrangement.

Referring now to FIG. 1, a computer-implemented VIC processing system 10 is shown, according to an example arrangement. The VIC processing system 10 includes a provider computing system 102 associated with a provider institution 100, a user device 104 managed by a user 20, a relying party computing system 106, and a network 108. In some arrangements, the provider institution 100 subscribes to or is a member of the services provided by an entity that operates the VIC processing system 10, for example a BSP. Each computing system 102, 104 may be structured as computer or processing system (e.g., a server with one or more processing circuits) including at least one processor or processing device and at least one memory or memory device. An example structure of the computing systems and other components of FIG. 1 and FIG. 2 are described herein below following the description of method 300 of FIG. 3. As will be appreciated, the VIC processing system 10 refers the general system of generating, managing, monitoring, dynamically updating, and providing VICs for users 20. The VIC circuit 116 refers to the specific circuit carrying out the generating, managing, monitoring, dynamically updating, and providing VICs for users 20.

The network 108 may include one or more of the Internet, cellular network, Wi-Fi, a proprietary banking network, secure network or intranet, such as an internal banking network associated with the provider institution(s), or any other type of wired or wireless network such as Local Area Network (LAN) or Wide Area Network (WAN). For example, the network 108 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (1×), General Packet Radio Service (GPRS), Personal Communications Service (PCS), 802.11X, ZigBee, Bluetooth, Wi-Fi, any suitable wired network, combination thereof, and/or the like. The network 108 is structured to permit the exchange of data, values, instructions, messages, and the like between the provider institution 100, user device 104, and/or relying party computing system 106.

The user device 104 may be owned by, associated with, or otherwise operated by a user 20. In one arrangement, the user 20 is a user of the provider institution 100 (e.g., may have an account at the provider institution 100). In other arrangements, the user 20 does not have a account associated with the provider institution 100 (i.e., is not a user of the provider institution 100). As shown in the example arrangement of FIG. 1, the user 20 may be an individual user, a representative for a group of users (e.g., a company representative), or the like that has one or more accounts at the provider institution 100. The user device 104 may include any type of mobile device that may be used to monitor or is otherwise associated with the VIC circuit 116. For example, the user device 104 may include, but is not limited to, a phone (e.g., smartphone, etc.), a computing device (e.g., tablet computer, laptop computer, person digital assistant, etc.), and a wearable device (e.g., smart eyeglass, a smart watch, and a smart bracelet, or other suitable device).

As shown, the user device 104 includes a network interface 118, a display device 120, an input/output device 122, a biometric sensor 124 and a secure element 126. While user device 104 is shown, it will be appreciated that a user 20 may have multiple user devices 104 connected to and able to conduct transactions with an account at the provider institution 100. For example, the user 20 has a smartphone and tablet that he or she uses to access and conduct transactions of the account with the provider institution 100. The network interface 118 may include, for example, program logic and various suitable hardware components (e.g., a network chip) that connect or facilitate connection of the user device 104 to the network 108.

The display device 120 is structured to receive and display a graphical user interface to the user 20. The graphical user interface (GUI) may display various accounts, balances, and payment services available to the user 20. The display 120 may also include showing the user 20 his or her confidence level as determined by the VIC circuit 116. The display device 120 may also operate as a biometric sensor 124 to capture finger prints (e.g., with smartphones) to authenticate through continuous enrollment against an enrolled fingerprint.

The input/output device 122 may be used to permit the user to initiate account access and to facilitate receiving requested information from the user. The input/output device 122 may include, for example, a keypad or keyboard, camera, a touchscreen, a microphone, biometric sensor, or any other device that allows the user to access the VIC circuit 116. Through the passive continuous enrollment of the VIC circuit 116, the input/output device 122 may be used to periodically or continuously capture authentication information during daily use of the user device 104. For example, the keyboard may capture word usage and typing patterns of the user device 104 and monitor changes to the pattern or usage, as it would indicate a potential unauthorized user of the user device 104. The input/output device 122 may be used to periodically capture the user's voice (e.g., capturing voice profile, but not content, when the user is using the user device for a call) and correlate with previously captured voice. Similarly, digital photographs taken by the user (e.g., selfies) on the input/output device 122 can be compared to previously captured pictures (e.g., at the initial enrollment). Additionally, the VIC circuit 116 may initiate a prompt on the user device and have the user speak passphrase into the input/output device 122 and correlate with previously captured voice. In some arrangements, the input/output device 122 captures an iris scan or other biometric type from the user during typical daily use of the user device 104.

The biometric sensor 124 is structured to read a fingerprint, voice print, or other biometric marker. Generally, the biometric sensor 124 is any device or combination of devices that support the capture of s biometric. In some arrangements, the input/output device 122 functions as the biometric sensor 124.

The secure element 126 is structured to be a secure memory storage device that may implement the VIC circuit 116 in one arrangement. The secure element 126 represents a dynamic environment in which application code and application data can be securely stored and administered and in which secure execution of applications occur. The element may provide delimited memory for each application. The secure element may be implemented either by a separate secure smart card chip (e.g., an embedded secure element), in the SIM/UICC (which is used by GSM mobile phone operators to authenticate subscribers on their networks and maintain personalized subscriber information and applications), or in an SD card that can be inserted in the mobile phone. In some arrangements, the secure element 126 contains some of, or all of, the VIC circuit 116. In other arrangements, the secure element 126 may provide for a connection to, link to, or communications to the provider computing system 102, and in turn the VIC circuit 116.

In operation, the user 20 can view account details on the display 120 that may include a confidence level, additional authentication options, and/or passcode information. For example, the user 20 may submit "updated" or new biometric type samples through the user device 104. Once authorized, an interface may be provided to the user 20 that allows the user 20 to submit a transaction request, receive or transmit the VIC, view the confidence level, and other features controlled by the VIC circuit 116.

The relying party computing system 106 is structured to request identity verification or information about the user 20 during a transaction request. As will be appreciated, the VIC circuit 116 acts as an authorization engine for all payment instruments, services, and the like, for a user. In some arrangements, a VIC token or authentication verification may be pushed to the user device 104 for a transaction originating with the relying party computing system 106. The user device 104 could provide the VIC to the relying party computing system 106, for example, as a QR code, to authenticate the transaction. For example, a merchant is charging the provider institution account of the user, the VIC circuit 116 may transmit the VIC token to the user device to be presented to the merchant and confirm the identity of the user. In some arrangements, the relying party computing system 106 receives a transaction request from the user 20 and request a VIC token for the user from the provider computing system 102.

As shown, the provider computing system 102 includes a network interface 110, an account processing circuit 112, an accounts database 114, and a VIC circuit 116. In some arrangements, the VIC circuit 116 is a standalone computing system in communication with the provider computing system 102. The network interface circuit 110 is structured to facilitate operative communication between the provider computing system 102, the user device 104, and the relying party computing system 106 over the network 108.

The account processing circuit 112 is structured to track, maintain, and incorporate transaction details for an account held by the provider institution 100. The account processing circuit 112 may interact with the VIC circuit 116 to ensure that when a user 20 makes a request to send funds to a third-party, that the funds are debited from the proper user account. Additionally, the account processing circuit 112 may store all or mostly all of the transaction information in an accounts storage database 114 within the provider computing system 102. As shown in FIG. 1, the account processing circuit 112 provides account information to the VIC circuit 116 to facilitate the generation of the confidence level for selective approval or denial of a proposed transaction.

The accounts database 114 is structured to store information regarding accounts at the provider institution 100. The information may include, but is not limited to, an age of the user, a membership date, account numbers and type of accounts held by the user, various statements (e.g., credit/debit statements for the accounts), passkey information, and so on, for a plurality of users. Additional information may include details regarding the types of accounts held within a provider institution, the type of user (e.g., a representative for many users, a commercial entity, an individual, etc.), prior issues with fraud or other credit related information, when various payment occurred, a receiving entity for each payment, an amount of each payment, a location of the user for each payment, etc.

The biometric sensor 115 is structured to capture a biometric sample from an individual and to process the biometric sample to generate the biometric data. The biometric sample can be for enrollment or a subsequent authentication event. The biometric data may be referred to as "raw" biometric data. For example, the sensor 115 can be of any biometric technology structured to read a fingerprint, voice print, or other biometric marker. Generally, the biometric sensor 115 is any device that supports the capture of biometric data. In some arrangements, the request is initiated by an employee of the provider institution 100 entering data into a computing system (e.g., an employee terminal connected to the server of the provider computing system 102) during a person-to-person interaction. For example, the user (e.g., the customer) may walk into a branch location of the BSP and initiate an enrollment request, a biometric reference template update, or a service requiring biometric authentication.

Based on the foregoing, and using at least some of the above information, the VIC circuit 116 is structured to determine a confidence level for a user, to continuously enroll the user 20, and to selectively control the approval of a funds transfer request based on at least one of the confidence level and transaction details. As shown in FIG. 1, the VIC circuit 116 is implemented with a provider computing system 102. In another arrangement, and as mentioned above, the VIC circuit 116 may be a VIC computing system implemented separate from the provider computing system 102. Further explanation of the structure and activities of the VIC circuit 116 are shown in FIG. 2.

Accordingly, referring now to FIG. 2, a schematic diagram of the VIC circuit 116 of FIG. 1 is shown according to an example arrangement. The VIC circuit 116 includes a continuous enrollment circuit 202, a confidence level circuit 204, and a notification circuit 206. In some arrangements, the VIC circuit 116 can be a stand-alone computing system in communication with the provider computing system 102. Accordingly, the VIC circuit 116 may have access to account information, transaction history, account type, and account history for each user 20 at the provider institution 100 enrolled in the VIC service (e.g., a service, such as a subscription service, that makes use of the VIC circuit 116). Generally speaking and explained in more detail herein, the VIC circuit 116 is structured to assign a user 20 into a confidence level via the confidence level circuit 204, update the confidence level through continuous enrollment (e.g., authentication factor gathering on the user device 104) via the continuous enrollment circuit 202, to receive a funds transfer request, and to determine an approval for the transaction request, via the confidence level circuit 204.

The continuous enrollment circuit 202 is structured to monitor and dynamically update the confidence level (e.g., that the user 20 is in possession and using the user device 104) of the user 20. As such, the continuous enrollment circuit 202 may be in operative communication with the account processing circuit 112 of the provider computing system 102 in FIG. 1. In order to dynamically determine the confidence level, the user may be required to periodically perform continued enrollment to strengthen the VIC. Such continuous enrollment can be conducted by the continuous enrollment circuit 202 in a background process that is taking place without the user's knowledge (e.g., passive authentication factor logic 210), thus saving time and improving reliability. Additionally, such continuous enrollment can be conducted by the continuous enrollment circuit 202 by prompting the user 20, through the notification circuit 206 of the VIC circuit 116, to provide authentication feedback (e.g., active authentication factor logic 212). In some arrangements, the continuous enrollment circuit 202 includes an authentication factor database (e.g., stored biometric and behavioral characteristics of the user 20) that is used to compare against authentication factors captured in real-time. Additionally, the authentication factor database can be used to update the stored authentication factor if biometric or behavioral characteristics of the user 20 change over time. For example, the user's 20 voice deepens with age, causing a slow alteration of the voice profile captured, and an update of the voice profile used by the continuous enrollment circuit 202 to authenticate a user of the user device 104, either passively or actively.

As shown, the continuous enrollment circuit 202 includes provider account logic 208, passive authentication factor logic 210, active authentication factor logic 212, and auto-maintain logic 214. Each of the logics 208, 210, 212, and 214 may be structured to collect and store various pieces of information regarding the user 20 and/or one or more accounts associated with the user 20. The collected and stored information may be used by the continuous enrollment circuit 202 to determine a continuous enrollment "score" to be used by the confidence level circuit 204 to assign the user 20 a confidence level. The inputs to the logics 208, 210, 212, and 214 may provide an indication of a likelihood that use of a user device 104 is done by the authorized user 20 and not an unauthorized user. In a way, the continuous enrollment circuit 202 logics 208, 210, 212, and 214 determine a "risk" associated with the security and possession of the user device 104. In some arrangements, the continuous enrollment circuit 202 may draw inputs, over the network 108, from information provided by an external account information system that has account information relating to other accounts held by the user 20 and fraudulent activity with other accounts that a user 20 may have.

The provider account logic 208, is structured to have access to all, or mostly all, of the user 20 information and details associated with the user's 20 account, including, the account type (e.g., checking, savings, money market, etc.), the number of payment channels available to the user (this may be based on the type of account associated with the user and/or the payment devices associated with the user), one or more account balances, the length of time the user 20 has been a member of the provider institution, and other user specific factors and information. As will be appreciated, the provider account logic 208 is also structured to monitor provider institution account activity through the user device 104 to develop a user 20 use profile and detect different behavior. Additionally, the provider account logic 208 may be structured to acquire and assemble information regarding one or more accounts of the user 20. For example, the information associated with the user can include criminal records, bankruptcy history and the like, whereas the user's account information may include payment history, transaction types and amount, and history of fraudulent transaction claims. Further, the provider account logic 208 to analyze the user's 20 prior transactions, including transaction amount, transaction type, the recipient, and the like, to generate a prior transaction history profile. In some arrangements, an executed transaction logic may be included that is operatively connected to the account processing circuit 112 or other circuits to access information regarding the previous transactions of the user. Generally, the prior transaction history profile provides an overview (e.g., snapshot, summary, etc.) of the types of payments and recipients of the payments in order to develop a financial health determination for the user 20.

The passive authentication factor logic 210, is structured to collect authentication factors in a background process that is taking place without the user's knowledge. The authentication factors include, but are not limited to, biological (e.g., fingerprint, iris, hand geometry, etc.) and behavioral (e.g., gait, gesture, keystroke dynamics, etc.) characteristics that reliably distinguish one person from another. Beneficially, because the authentication factors are in a background process that is taking place without the user's knowledge, an unauthorized user would be unaware of the fact he or she was being monitored. Consequently, the passive authentication factor logic 210 can detect a change in the biological and behavioral characteristics through the user device 104, resulting in a confidence level decrease and, potentially, a halt on transactions through the user device 104 until the biological and behavioral characteristics through the user device 104 are recognized. The captured passive authentication factors may be stored within the continuous enrollment circuit 202, VIC circuit 116, or other location in the VIC processing system 10. By way of example of the passive continuous enrollment, the passive authentication factor logic 210 may cause the user device 104 to periodically capture the user's voice (e.g., capturing voice profile, but not content, when the user is using the user device for a call) and correlate with previously captured voice to make sure that the person using the user device is still the user associated with the VIC. Similarly, digital photographs taken by the user (e.g., selfies) using the user device 104 can be monitored and correlated against previous photos by the continuous enrollment circuit 202. Such continued enrollment may be performed independent of any transactions that require VIC verification processes.

The active authentication factor logic 212 is structured to collect authentication factors that are prompted. The authentication factors include, but are not limited to, biological (e.g., fingerprint, iris, hand geometry, etc.) and behavioral (e.g., gait, gesture, keystroke dynamics, etc.) characteristics that reliably distinguish one person from another. The active authentication factor logic 212 may initiate a prompt on the user device 104 and have the user speak passphrases into the phone. Doing so allows the active authentication factor logic 212 to correlate the prompted capture voice profile with a previously captured voice to make sure that the person using the user device is still the user associated with the VIC. Such continued enrollment may be performed independent of any transactions that require VIC verification processes. Such continuous enrollment can also account for changes to the biometric information (e.g., how the user looks or how the user's voice changes over time) over time. Beneficially, the active authentication factor logic 212 may be used when the confidence level is low and a transaction is requested. Without an active authentication event the transaction would be denied, but with a positive match in an active authentication event, the transaction is approved. Additionally, such continuous enrollment can be conducted by the continuous enrollment circuit 202 by prompting the user 20, through the notification circuit 206 of the VIC circuit 116, to provide authentication feedback (e.g., active authentication factor logic 212).

In this arrangement, an auto-maintain logic 214 may be included with the continuous enrollment circuit 202 to control when the authentication factors are captured. The auto-maintain logic 214 is structured to dynamically collect or monitor the authentication factors or provider institution account activity of the user 20 on some schedule or to dynamically based on activity. For example, every week a user's 20 device usage may be passively monitored and authenticated. The auto-maintain logic 214 may be set to update the user account status whenever a request to use a user payment channel is received. Beneficially, the auto-maintain logic 214 may provide feedback to the why the user's continuous enrollment has decreased and if the decrease caused a corresponding decrease in the confidence level.

The confidence level circuit 204 is structured to dynamically adjust the confidence level of the user 20. As previously stated, the confidence level refers to the likelihood that the initiating party of the transaction through the user device 104 is the authorized user 20, and account holder, of the account with the provider institution 100. The identity confidence level of a user may also affect transaction specific details, for example, related to the allowed quantity (i.e., amount) or quality (i.e., recipient) of the requested transaction. In particular, the confidence level of the user 20 may be determined or calculated based on a variety of inputs and factors. Further and in addition to controlling placement of a user into an initial confidence level, the confidence level circuit 204 controls dynamic adjustment of the confidence level in response to various activity regarding the user 20. For example, if the user has a low confidence score a large transaction to a new recipient may be rejected by the provider institution or require active continued enrollment on the user device by the initiating party to verify that he or she is the authorized user and account holder. Therefore, a transaction request submitted by the user with a low confidence level that designates a "riskier" recipient or amount may be rejected by the VIC circuit 116. In one arrangement, the confidence level circuit 204 may dynamically update the user's tier information on a scheduled basis responsive to the user's biometric enrolled with the provider institution 100. In other arrangements, the confidence level circuit 204 serves solely as an initial placement of the account into a confidence and then the account is adjusted via the continuous enrollment circuit 202. The confidence level may be a plurality of confidence levels (e.g., 1 to 100) with various numbers benchmarking access to effectuate different levels (e.g., amount, recipient, etc.) of transactions. In other arrangements, the confidence level is a binary system.

As shown, the confidence level circuit 204 includes enrollment logic 216, continuous enrollment logic 218, and auto-maintain logic 220. The confidence level circuit 204 uses the user's confidence level, determined by the current status of the continuous enrollment circuit 202 and enrollment logic 216 to calculate a confidence level for a user 20 to be subsequently used for a requested funds transfer or identification event. As will be appreciated, a greater user confidence level will result in a greater usability of the user's provider institution account, including type, number, and speed of a funds transfer request. Accordingly, the dynamically adjusted confidence level is representative of the likelihood that the initiating party of an account action through the user device 104 is the user 20 and not an unauthorized party. Depending on the implementation, the confidence level circuit 204 may use anywhere from one or both the enrollment logic 216 and continuous enrollment logic 218. In some arrangements, a transaction logic is used to determine whether the transaction, based off of the transaction details, should be approved in response to the confidence level.

Referring first to the enrollment logic 216, the enrollment logic 216, is structured to determine the extent and strength of the information of the user 20 enrolled with the VIC processing system 10. The enrollment logic 216 may be indicative of an "initial enrollment" of the user. The initial enrollment refers to the level, categorization, or other classification of the user based on at least one of financial information regarding the user 20, biometrics captured from the user 20, and a device. The financial information regarding the user 20 may include, but is not limited to, a transaction history, an identity of a funds transfer recipient(s), one or more account balance(s), a fraud risk, an account history (e.g., predicted withdrawals/deposits over a certain amount of time, etc.), etc. The biometric may include, but is not limited to, one or more biometric data samples (e.g., fingerprint, voiceprint, iris image, hand geometry, keystroke patterns, dynamic signatures) (typically two or more samples) captured from the user via a biometric sensor. A BSP may be tasked with verifying and vetting the user's identity during initial enrollment and/or during continued enrollment. In some instances, this includes vetting the user identity against collateral material such as photo identification, government-issued identification, birth certificates, and the like. The customer device may include, but is not limited to, type of device, ability to capture biometrics, security settings, and related mobile device characteristics.

As will be appreciated, biometrics captured using a vetted or trusted process are referred to herein as "enrollment" [biometric type] (e.g., fingerprint, voiceprint, iris image, hand geometry, keystroke patterns, dynamic signatures). The initial enrollment may be an initial starting point or input for the confidence level. The more robust (e.g., multiple biometrics captured), the higher the confidence level of the VIC. In some arrangements, enrolling certain biometric types (e.g., those that have robust capturing and matching algorithms) may result in a higher confidence level compared to another biometric type. For example, the user enrolling an iris scan may increase the confidence level greater than the user enrolling a fingerprint. After initial enrollment, the user 20 may provide additional biometric or enrollment information to the VIC circuit 116. The information may be provided through the user device 104 or by traveling to a brick and mortar branch of the provider institution 100. As will be appreciated, the enrollment logic 216 may assign a higher confidence level to enrollment information provided at a brick and mortar branch of the provider institution 100 compared to information provided through the user device 104.

After placement and subsequent transactions, the confidence level circuit 204 can continuously authenticate the user 20 and dynamically adjust the confidence level through the continuous enrollment logic 218. The continuous enrollment logic 218 is structured to retrieve the dynamic authentication of the user 20 of the user device 104 from the continuous enrollment circuit 202. Beneficially, continuous enrollment logic 218 may control the type, frequency of capture, and storage of authentication factors monitored and captured by the continuous enrollment circuit 202. The continuous enrollment logic 218 may change the operation of the continuous enrollment circuit 202 to adopt more robust authentication techniques or to provide a wider variety of possible authentication information.

In this arrangement, an auto-maintain logic 220 may be included with the confidence level circuit 204 to control when enrollment data is reviewed or requested to be updated or when the continuous enrollment circuit 202 should operate. The auto-maintain logic 220 is structured to dynamically adjust the confidence level, based on the collected, or monitored authentication factors, provider institution account activity of the user 20, on some schedule or dynamically based on activity. For example, every week a user's 20 confidence level may be re-calculated based on changes to biometrics enrolled and continuous enrollment authentication. The auto-maintain logic 220 may be set to update the user account status whenever a request to use a user payment channel is received. Beneficially, the auto-maintain logic 220 may provide feedback as to the why the user's continuous enrollment has decreased and if the decrease caused a corresponding decrease in the confidence level.

The notification circuit 206 is structured to transmit and manage notifications that are provided to users 20 as a result of the processes and determinations by the VIC circuit 116. For example, the notification circuit 206 may provide notifications (e.g., push notifications, SMS messages, etc.) to the user device 104 of the user 20. The particular content and triggering parameters of the notifications may be user-defined and/or may be automatically defined (e.g., by the provider computing system 102 that provides the VIC circuit 116). Notification content may include, among other things, rejected requests, a transaction limit amount for an intended recipient, spending limits for the user over a time period, account balances, confidence level increases or decreases, warnings, messages, etc. Notifications may be provided in real-time or near real-time. For example, notifications may be triggered based on executed transactions, such as a decrease in the confidence level or a confidence level being within a threshold value of automatic (e.g., user device compromised) rejections of transactions through the user device 104. Further, the notification circuit 206 may be set to automatically generate upon a certain conditions occurring. For example, if a confidence level dips quickly in a short period of time, the VIC circuit 116 may require the user to authenticate at a brick and mortar banking institution in order to allow for further account transactions and activity.

By way of example, the VIC circuit 116 may determine the user 20 has a confidence level of 3 out of 10, based on the initial enrollment of one biometric at a brick and mortar branch of the provider institution and a new account opening. This confidence level may limit transactions initiated on the user device 104 at a moderate starting point (for example, 1000 U.S.D.). At some point a requested transaction, including recipient, speed of delivery, and other details is received. The VIC circuit 116 will use the confidence level of the user to determine approval of the transaction. In another example, the VIC circuit 116 may determine the user 20 has a confidence level of 9 out of 10, based on the initial enrollment of five biometric sat a brick and mortar branch of the provider institution and a long-term relationship with the provider institution 100. This confidence level may limit transactions initiated on the user device 104 at a higher starting point (for example, 10,000 U.S.D.). At some point a requested transaction, including recipient, speed of delivery, and other details is received. The VIC circuit 116 will use the confidence level of the user to determine approval of the transaction.

Figure 3:
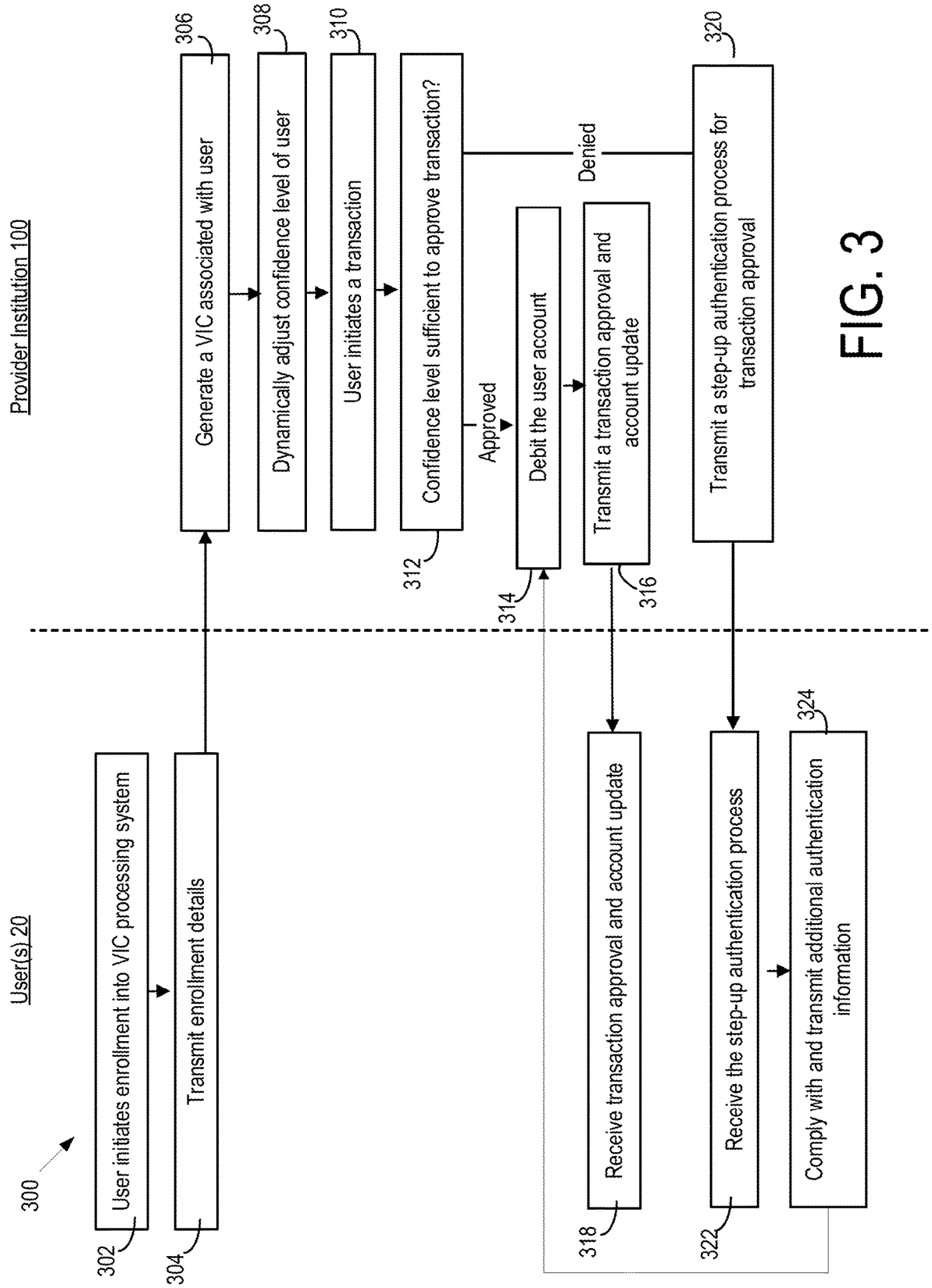
FIG. 3 is a flow diagram of generating and using a virtual identity card, according to an example arrangement.

Referring to FIG. 3, a flow diagram of a method 300 of generating and using a VIC is shown, according to an example arrangement. The method 300 could be used to enroll in a VIC processing system and have continuously enrolled confidence level of authentication for a user device, which may result in the approval or denial of a single requested transaction. The method 300 is described in relation to a user 20 and a provider institution 100. As will be appreciated, the actions of the user 20 may be performed on a user mobile computing device or user device 104, as described in FIG. 1. Relatedly, the actions of the provider institution 100 may be performed on a provider computing system 102, as described in FIG. 1. Further, the method 300 may be implemented, at least in part, by the VIC circuit 116 and the components of FIGS. 1-2, such that reference may be made to the components of FIGS. 1-2 to explain method 300.

Method 300 begins with the user 20 initiating initial enrollment into the VIC processing system 10 at 302. The initial enrollment refers to the level, categorization, or other classification of the user based on at least one of financial information regarding the user, biometrics captured from the user, and a customer device. The financial information regarding the user may include, but is not limited to, a transaction history, an identity of a funds transfer recipient(s), one or more account balance(s), a fraud risk, an account history (e.g., predicted withdrawals/deposits over a certain amount of time, etc.), etc. The biometric may include, but is not limited to, one or more biometric data samples (e.g., fingerprint, voiceprint, iris image, hand geometry, keystroke patterns, dynamic signatures, and typically two or more samples) captured from the user via a biometric sensor. A BSP may be tasked with verifying and vetting the user's identity during initial enrollment and/or during continued enrollment. In some instances, this includes vetting the user identity against collateral material such as photo identification, government-issued identification, birth certificates, and the like. The customer device may include, but is not limited to, type of device, ability to capture biometrics, security settings, and related mobile device characteristics. As will be appreciated, biometrics captured using a vetted or trusted process are referred to herein as "enrollment" [biometric type] (e.g., fingerprint, voiceprint, iris image, hand geometry, keystroke patterns, dynamic signatures). In some arrangements, initial enrollment includes identifying one or more user devices 104 that will be enrolled in VIC processing system 10. In some arrangements, this includes downloading a mobile application on each user device. This step may include a mutual authentication process between the user 20 and the provider institution 100

At 304, the provider institution 100 receives the initial enrollment details from the user. The initial enrollment may be an initial starting point or input for the confidence level. The more robust (e.g., multiple biometrics captured) the higher the confidence level of the VIC. In some arrangements, enrolling certain biometric types (e.g., those that have robust capturing and matching algorithms) may result in a higher confidence level compared to another biometric type. For example, the user enrolling an iris scan may increase the confidence level greater than the user enrolling a fingerprint.

At 306, the provider institution 100 generates a VIC associated with user 20. The VIC includes an initial confidence level for the user, responsive to the data provided during initial enrollment at 302, and a user device that is being continuously enrolled to dynamically adjust the confidence level of the user 20. In some arrangements, the VIC may be transmitted from the provider institution 100 to the user device 104 and stored as a secure element that implements a VIC circuit 116. The secure element may be a dynamic environment in which application code and application data can be securely stored and administered and in which secure execution of applications occur. The element may provide delimited memory for each application.

At 308, the provider institution dynamically adjusts the confidence level of the user 20 through continuous enrollment of the user 20. As discussed in greater detail above, confidence level refers to the likelihood that the initiating party of the transaction through the user device is the authorized user 20, and account holder, of the provider institution's account. In this regard, the identity confidence level of a user 20 may be indicative of the level of identifying information provided during enrollment into the VIC processing system 10 and the continued enrollment and authentication of the user device over a period of time.

At 310, the user 20 initiates a transaction (e.g., funds transfer) through the user device. For example, the user 20 enters the details for the requested funds transfer (e.g. transaction), including the desired payment channel (e.g., bill pay, credit card, etc.), the transfer amount, source account, the transfer recipient, and any other details relating to the funds transfer request (e.g., a speed of the funds transfer, etc.). For example, the user may submit a bill pay recipient of the City Power Company, for 50 U.S.D. to be transferred from the user's 20 savings account. This step may include a mutual authentication process between the user 20 and the provider institution 100.

At 312, the provider institution 100 determines if the confidence level of the user 20 is sufficient to approve the received transaction. The transfer details are received on the provider computing system 102 from the user device 104 that has been authenticated and has access to the payment channels tied to the account. The VIC circuit 116, or other circuit in the provider computing system 102, compares the confidence level of the user 20 determined by the VIC circuit 116 to the requested transaction amount. The VIC circuit 116, or other circuit in the provider computing system 102 responsive to the VIC circuit 116, will approve the transfer funds request if the dynamically determined confidence level is sufficient given the requested transaction, at 314. The VIC circuit 116 will deny the transfer funds request if the dynamically determined confidence level is not sufficient given the requested transaction, at 320. In some arrangements, a denied transaction results in the provider computing system 102 transmitting the failed transaction to the user device 104. In this way, the VIC circuit 116 acts as a dynamic authorization engine for all payment instruments, services, and other payments for the user.

Turning to a denied transaction process at 320, the provider computing system 102 will, if applicable, transmit to the user device 104 a set of step-up authentication steps. The authentication steps are actions, taken by the user 20, to increase the transaction limit and/or the user's confidence level, potentially resulting in the transfer request being granted. The step-up authentication steps may be similar to those used during active continuous enrollment (e.g., one of the active authentication factors). The step-up authentication steps may include, for example, adding funds to the source account, traveling to a branch of the provider institution 100 to provide identification, providing further details regarding the recipient, and the like. The step-up authentication can include a splash page when the user accesses a website associated with the provider institution, a push notification, a text message, and an email message to the user.

At 322, the user 20 receives the step-up authentication process details and/or options. The user 20 complies with one of more of these options to provide additional authentication or funds to the user's accounts, at 324. The act of complying with the details may include transmitting details via the user device 104 to the provider computing system 102 via the network 108.

At 314, the user's transfer funds transaction request is approved. This is either due to the initial request, at 312, being approved by the VIC circuit 116, or the user 20 has done additional actions to increase the confidence level, at 324. When the transaction is approved, the user's 20 account is debited by the approved transfer amount. At 316, a transaction approval message and an account update are generated by the provider computing system 102 and transmitted to the user 20.

At 318, the user 20 receives the transaction approval and account update on the user device 104. The user 20 may receive the confirmation and details the next time he or she logs into his or her account, or it may be retrieved instantaneously through push notifications tied to the provider institution 100.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be remote processors (e.g., a cloud based processor). Alternatively or additionally, the one or more processors may be internal and/or local to the apparatus. In this regard, a given circuit, or components thereof, may be disposed locally (e.g., as part of a local server, a local computing system, etc.) or remotely (e.g., as part of a remote server such as a cloud based server). To that end, a "circuit," as described herein, may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data that cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should also be noted that the term "input devices," as described herein, may include any type of input device including, but not limited to, a keyboard, a keypad, a mouse, joystick, camera, microphone, or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, ERC20, and the like. Any foregoing references to blockchains or repositories are intended to include any distributed ledgers. Examples of distributed ledgers include R3CEV Corda, Hyperledger, Ethereum, and the like.

It should be noted that, although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes, and omissions may be made in the design, operating conditions, and arrangement of the arrangements without departing from the scope of the present disclosure as expressed in the appended claims.

What is claimed is:

1. A computer-implemented method, comprising:
capturing, by a user device, a voice of a user;
receiving, by the user device, an enrollment of the user, the enrollment comprising the captured voice of the user;
storing, by the user device, the enrollment of the user;
sending, by the user device, the enrollment of the user to a provider computing system;
receiving, by the user device, a virtual identification card (VIC) including a confidence level for the user, the confidence level corresponding to a level of confidence that the user is authorized to use the user device;
storing, by the user device, the VIC including the confidence level;
collecting, by the user device, account activity information from an account information system via a communication network;
periodically collecting authentication information, by the user device, wherein periodically collecting authentication information comprises capturing, by the user device, a first voice sample of the user, on a call, using the user device;
comparing, by the user device, the first voice sample captured while the user was on the call to the captured voice of the user in the stored enrollment;
decreasing, by the user device, the, a confidence level of the user based on the account activity information and the comparison;
displaying, by the user device, a prompt for a second voice sample;
receiving, by the user device and in response to the prompt, the second voice sample from the user;
comparing, by the user device, the second voice sample to the captured voice of the user in the stored enrollment;
updating, by the user device, the confidence level based on the comparison of the second voice sample to the captured voice of the user in the stored enrollment by increasing the confidence level;
receiving, by the user device, a transaction request; and
approving, by the user device, the transaction request using the updated confidence level.

2. The method of claim 1, further comprising:
receiving, by the user device, an authentication request, wherein the authentication request comprises a request for additional authentication information including an additional authentication step.

3. The method of claim 2, wherein the request for additional authentication information is received via at least one of a splash page of the provider computing system, a push notification, a text message, and an email message.

4. The method of claim 1, further comprising: displaying, by the user device, an indication of how the confidence level of the user affects a payment device of the user.

5. The method of claim 1, wherein periodically collecting authentication information further comprises collecting, by the user device, at least one of, a picture, hand geometry, or gesture of the user.

6. The method of claim 1, further comprising:
capturing, by the user device, digital photographs taken by the user; and
updating, by the user device, the confidence level based on a comparison between the digital photographs and previous digital photographs taken by the user.

7. The method of claim 1, further comprising:
storing, by the user device, a voice profile of the user and updating, by the user device, the stored voice profile using the second voice sample.

8. The method of claim 1, wherein the confidence level includes a first confidence level associated with a quality of the transaction request and a second confidence level associated with a quantity of the transaction request, wherein the quality of the transaction request comprises an identity of the user and the quantity of the transaction request comprises an amount.

* * * * *